Sept. 2, 1930.   E. E. TURNER, JR   1,775,073
VACUUM TUBE CIRCUITS
Filed June 20, 1927
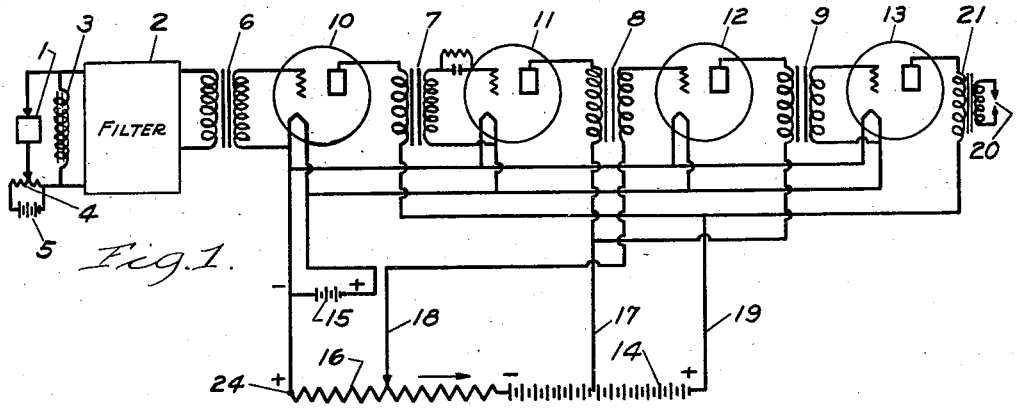
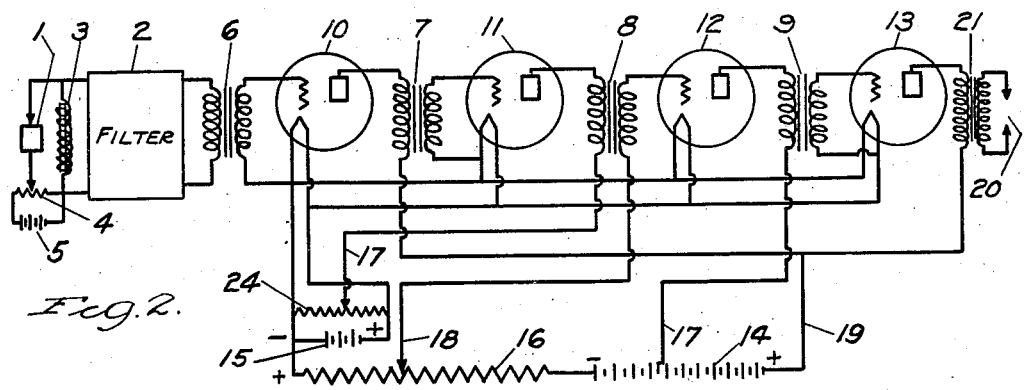
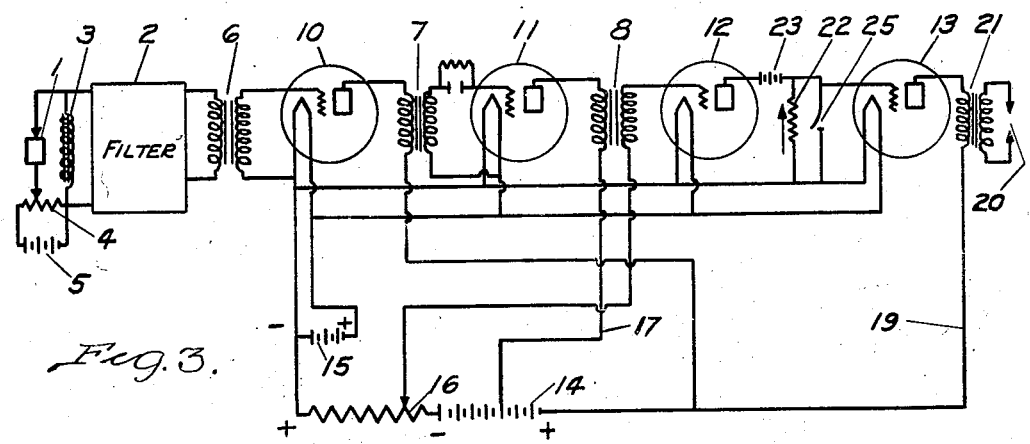
INVENTOR.
EDWIN E. TURNER JR.
BY
Ezekiel Wolf
ATTORNEY.

Patented Sept. 2, 1930

1,775,073

UNITED STATES PATENT OFFICE

EDWIN E. TURNER, JR., OF WEST ROXBURY, MASSACHUSETTS, ASSIGNOR TO SUBMARINE SIGNAL COMPANY, OF BOSTON, MASSACHUSETTS, A CORPORATION OF MAINE.

VACUUM TUBE CIRCUITS

Application filed June 20, 1927. Serial No. 200,086.

The present invention relates to a sound receiving system particularly adaptable for the taking of soundings by the measurement of the time interval necessary for a sound impulse to travel to the bottom and the reflected impulse to return to the receiving system.

In such a system it is essential that the circuit operate accurately without substantial delay and further that it be of sufficient sensitivity and stability to warrant commercial adoption on vessels of all types.

In the present invention the impulse received by the microphone receiver commences the operation of a certain transient phenomenon which has a reactive effect, building the phenomenon up so rapidly as to cause a powerful induced voltage across a suitable indicator. In one form of the system employed after the phenomenon has built up to a maximum the circuit remains paralyzed until manually released, but in the preferred form, which I employ, normal conditions are again established within a comparatively short time so that the circuit is again ready to receive a succeeding impulse.

As the speed of sound in water is approximately four times as fast as in air, and as the intervals to be measured in the systems where the present invention is employed are often as small as one hundredth of a second, it can readily be appreciated that an error of 10% only allows a time interval error of one thousandth of a second and, therefore, that the apparatus must operate not only extremely accurately but quickly.

For this reason I have made use of the transient phenomenon of a circuit whose time constant is of a smaller and different order of magnitude than the time interval to be measured, so that substantially for any depth, however small, the time occupied for the transient phenomenon to take place is of an order far smaller than other sources of error of the apparatus.

Not only has it been possible to eliminate all mechanical relay or current controlling devices, but it has also been possible to design a current controlling device which will operate on a minimum intensity of signal.

The latter fact makes it possible to measure depth with far greater accuracy over a much larger range than heretofore.

The mechanical relays formerly employed in finding depths of water by the so called time of travel method are not particularly stable, since they are usually operated on small current and control currents of considerable value. Difficulty has further been found in eliminating external vibrations, which usually operate the relay, and also in keeping the relay in adjustment due to the minute arcing which occurs in breaking an electrical contact.

In the present electrical system, all these difficulties have been avoided. The signal is first received on a microphone, then passed through a filter to eliminate the extraneous sounds, and finally impressed upon the relay circuit. It is particularly important to filter the extraneous sounds in the present case, since the relay circuit is aperiodic and would operate on any impressed potential. This follows directly from the nature of the relay, since the latter operates by means of the transient phenomenon established in the circuit and is independent of frequency, and since merely by impressing the minimum potential on the grid of the proper tube in the circuit, the relay operates regardless of the frequency of the potential impressed. It is, therefore, quite essential to eliminate any signals or noises which are not desired in the system, as otherwise they would tend to operate the circuit.

An additional feature which adds greatly to the good operation of the present circuit is a means whereby the signal strength in the relay circuit is kept within certain limiting values regardless of the strength of the initial signal. In this manner all difficulties due to shocks in the system, paralyzing the tubes, or excessive potentials are eliminated and the circuit operates uniformly for any signal of sufficient strength to operate it.

The theory underlying the operation of the system, as well as the operation itself, will be best understood from the following description in connection with the drawings, in which Figure 1 shows the general circuit;
Figure 2 shows the circuit with a slight modification; and
Figure 3 shows the circuit with still another modification.

In Figure 1, the sound is received by the microphone or other sound receiver 1 which translates the sound impulse into electrical variations and impresses the latter upon the filter 2. The microphone is energized by a direct current source 5 by means of the potentiometer 4, which controls the amount of direct current passing through the microphone. A choke 3 is also provided to by-pass the direct current and allow the current variations due to the sound impulses to be impressed upon the filter circuit. From the output of the filter the impulses are delivered to the transformer 6; that is, the desired signal impulses, since the other electrical impulses are filtered out. The filter is constructed to bypass current variations of the signal frequency, since the sound signal and therefore the electrical variations have the same well defined frequency. It is essential to have a signal of a well defined frequency as the sound signal to be received, since the relay is designed to operate on any impulse and would, therefore, be operated by any impulse if a filter were not provided to eliminate extraneous impulses and transmit a signal of a given frequency.

The vacuum tube 10 and its associated circuits act as an amplifier for the signal impressed upon it by the transformer 6 and conceivably could be omitted from the circuit provided the signal was of sufficient intensity. It is, however, advantageous to amplify after filtering, as usually the filtered signal is not sufficiently powerful to operate the rest of the circuit in the manner desired.

The rest of the circuit comprises a detector tube 11 and its circuit, the function of which will be explained in greater detail later, the relay control tube 12 and its circuit, the relay tube 13 together with its circuit, and the indicating tube and circuit.

The signal is impressed upon the detector tube circuit by the transformer 7, the primary of which is connected to the output of the prior tube circuit. The detector tube and circuit operate in the usual manner and may employ a grid leak and condenser as shown in Figure 1 or a slight grid bias as shown in Figure 2, where the grid return goes back to the negative side of the filament. In the circuit shown both in Figure 1 and Figure 2, the detector tube rectifies the signal. In Figure 1, when a signal is impressed upon the tube 11, the plate current in the primary of the transformer 8 is decreased. The secondary of the transformer 8 is so connected that the grid side of the secondary of the transformer becomes more positive. The grid of the tube 12, therefore, greatly increases the flow of plate current in the circuit of that tube and through the primary of the transformer 9. The terminals of the secondary of this transformer are so chosen that the grid of the tube 13 becomes negative, thus tending to decrease the flow of electrons from the filament to the plate and therefore decreasing the plate current in the plate circuit of the tube 13.

A decrease in plate current in the circuit of the tube 13 means a decrease in current in the direction of the arrow in the resistance 16, which is in series in this plate circuit, since the plate current of the last tube is by far the greater part of the total current flowing through the resistance 16. This is particularly true, since the detector plate circuit takes very little current and the grid of tube 12 is negative with respect to its filament, thus preventing a large plate current from flowing in the plate circuit of that tube. As the current in the resistance 16 decreases, the potential of the point of connection of the lead 18 to the resistance 16 approaches the same potential as the point 24, since the potential drop between 24 and the lead 18 has decreased. Obviously, the grid of tube 12, although negative with respect to the filament of the same tube, has become less negative, thus tending to further increase the plate current of the tube 12. This effect continues; namely, that of increasing the plate current in the tube 12 and decreasing the plate current in the tube 13 by making the grid of the tube 12 more and more positive with respect to the filament of the same tube, and making the grid of the tube 13 more negative by the rapid change induced from the primary of the transformer 9 to the secondary of the tube 13, of which the negative end connects with the grid of the tube. It is possible that even after passing through the filter and rectifier the incoming signal may be so large as to overcome completely the negative bias on the grid tube 12 in which case the plate current of tube 13 will be considerably reduced at once. However, it is not at all necessary that the signal current be so large and in practice it will be much smaller than this. The incoming signal need be only strong enough to cause some decrease in the plate current of tube 13 after which, by the action just explained, the plate current will automatically be further reduced.

An important feature of the operation of the circuit is that the current in the primary of the transformer 21, which is in the plate circuit of the tube 13, is made to change at such a rapid rate by this transient phenomenon which takes place in the circuit that a high voltage is induced in its windings and a correspondingly much higher voltage across the secondary, since the transformer is a step up transformer, with the result that the gap in the indicator 20 is broken down momentarily and an electric discharge occurs across it, giving an indication.

Since the grid of the tube 13 is connected through the secondary of the transformer 9 to the positive end of the filament, as soon as the effect of the transient phenomenon due to the signal has passed, it will assume the potential of the positive side of the filament, establish rapidly (but not so rapidly as the breakdown occurred as is explained below, since thereby another flash would be produced) the normal current flowing in the filament plate circuit of the tube 13 and be ready again for another signal.

It will be noted that the above operation is not in the ordinary nature of a feed back or a regenerative effect, since there is no tendency towards the building up of sustained oscillation or any repeated steady state reaction in the circuits involved. The portions of the complete circuit are so intimately connected with one another that the breakdown of the current in the last tube occurs from the simultaneous change in the whole system and not on account of any feed back from one part of the system to another.

To give an explanation of the above statement, it will be noted that simultaneous with the potential of the grid of the tube 13 becoming more negative, the current in the resistance 16 drops and the grid of the tube 12 becomes more positive with respect to the filament of that tube, and, therefore, the grid of the tube 12 is further changed positive even as the current in the filament plate circuit of tube 13 is decreasing.

It may further be noted that the control of the potential of the grid of the tube 12 is positive, controlled by the position of the lead 18 on the resistance 16 and that the potential of the grid of the tube 13 is controlled indirectly therethrough by the resulting potential induced across the secondary of the transformer 9, which potential overcomes the normal potential of the grid above the filament, since the former is connected to the positive side of the filament.

The circuit is purposely designed so that the breakdown of the plate-filament current in the tube 13 occurs very rapidly and the building up to a normal value after the breakdown takes place much more slowly, so that the indicator 20 will not discharge twice, once on the breakdown and once on the building up. Further, the method employed in the present case is that of causing the indication by the interruption of an established current rather than by establishing a current. The former method has been found to be more sensitive, reliable and capable of giving better indications.

The circuit employed in Figure 2 is sometimes preferable to that in Figure 1, since it includes a means for limiting the signal strength finally induced into the circuits of the last two tubes. Whereas in Figure 1 a grid leak and condenser are employed in the circuit of tube 11 and the plate is given a considerable positive potential as shown by the position of the lead 17 with respect to the battery 14, in the circuit shown in Figure 2 the plate potential of the tube 11 goes to the potentiometer 24 across the filament battery 15 and thereby allows a smaller and better adjustable method of giving the correct potential to the plate of the detector tube. The grid return of the detector tube 11 in Figure 2 returns to the negative side of the filament. The result of this arrangement of the circuit shown in Figure 1 is that the detector tube is operating on the lower part of the plate filament characteristic where the preponderance of change by rectification causes an increase in plate filament current, since a small positive change in the potential of the grid causes a correspondingly large increase in the plate filament current, whereas a small negative change in the potential of the grid hardly decreases the plate filament current.

The plate return 17 is led to the potentiometer 24 so that its position and thereby its potential may be adjusted with respect to the filament and that thereby the plate filament current may be controlled. Thus it is possible to limit the maximum response of the detector tube without substantially affecting its sensitivity to weak signals, as the effect of increasing the potential of the plate with respect to the filament is to raise the limit of saturation of the plate filament characteristic. In this manner, if, therefore, a very powerful signal or even extraneous sound or shock should be of excessive strength even after being passed through the filter, the arrangement of the detector tube providing a limiting maximum plate filament current below the value of possible harm or undesirability is essential to the good operation of the circuit.

The operation of the detector tube in Figure 1 with a grid leak and condenser is such as to cause a building up of a negative potential on the grid of the detector tube with respect to its filament and therefore cause a decrease in the plate filament current. On receipt of the signal in the detector tube the plate current in the transformer 8 of Figure 1 decreases, which is the opposite condition from that which happens in the circuit of Figure 2. It is evident, therefore, since in the present invention it is highly essential to have the grid of the tube 12 go positive, that the secondary of the transformer 8 must have reversed positions in Figure 1 from that in Figure 2 in order to obtain the correct potential on the grid of the tube 12.

The circuit shown in Figure 3 differs from that in Figure 1 in that the grid of the tube 13 is made to go negative by means of the resistance 22 in place of the transformer 9 shown in Figure 1. When the grid of tube 12 becomes more positive than initially on account of the signal, the current in the plate filament circuit increases, and, therefore, the potential difference across the resistance 22. Since the current flows in the direction of the arrow besides the resistance, the potential at the grid end drops with respect to the potential at the filament end, thus causing the grid of the tube 13 to become more negative and cut off the plate filament current flowing in the plate filament circuit of that tube. The restoration of normal conditions differs from the operation of Figure 1 in that in order to restore the grid to its normal potential the key 25 must be closed, whereas in Figure 1 after the change has occurred the grid assumes its normal potential, that of the positive side of the filament. While I wish to make it clear that I prefer to operate the circuit by making the grid of the last tube negative and interrupting a current already established, it is also possible to operate the circuit in the reverse manner by causing the grid of the tube 12 to become negative and that of tube 13 positive and bring about the rapid establishment of the plate filament current in the last tube. The indicator, as has been explained, is designed to operate on a change of current and it makes no difference, therefore, in what direction this change occurs.

As has been mentioned above, the reestablishment of normal conditions is brought about after the change has died down and no current is flowing in the plate filament circuit of the last tube by the fact that the grid return is connected to the positive side of the filament, therefore giving the grid a slight positive charge over the filament. Since this is a constant positive potential and is not amplified by any interaction between tubes and circuits as the breakdown is, the normal plate filament current in the last tube builds up more slowly than the breakdown, so that the potential induced across the indicator is not enough to operate it, even though the current in the circuit is brought back to its normal value. However long the time for the restoration of normal plate filament current is, it is never of such a time interval as to prevent a very rapid operation of the device. The restoration is less than one thousandth of a second, how much is difficult to say, and the occurrence of the operating phenomenon is, of course, much less than that.

Having described my invention, I claim:

1. In a system for indicating the reception of wave energy, a plurality of vacuum tubes and vacuum tube circuits comprising a detector tube and detector tube circuit, a second vacuum tube and vacuum tube circuit coupled to the output of said detector tube circuit, and a third vacuum tube and vacuum tube circuit coupled to the output of said second vacuum tube circuit, said first coupling being arranged to make the grid of said second vacuum tube positive with respect to its filament upon the receipt of an electric impulse, said second coupling being arranged to make the grid of said third tube negative with respect to its filament, and a resistance common in part in the plate filament circuit of both said second and third circuits for further increasing the positive potential of the grid of said second tube with respect to said filament.

2. In a system for indicating the reception of wave energy comprising a plurality of vacuum tubes and circuits, including means for impressing a positive potential upon the grid of one tube, means controlled by the operation of the first named means for impressing a negative potential upon the grid of a second tube, and means common in the plate filament circuit of the circuits of both tubes for further increasing the positive potential upon the grid of the first tube.

3. In a system for bringing about the operation of an indicator by the rapid change in the plate filament current of a vacuum tube circuit comprising a three element vacuum tube having a comparatively large plate filament current, a second three element vacuum tube having a negligible plate filament current and means including the above recited elements for increasing the plate filament current of the second vacuum tube and decreasing the plate filament current of the first vacuum tube, the decrease being of a larger order of magnitude than the increase.

4. In a system for bringing about the operation of an indicator by the rapid change in the plate filament current of a vacuum tube comprising a plurality of vacuum tubes and circuits having partly in common in the plate filament circuits resistance means and separate connecting points on said resistance for the filament and grid of one of said tubes, and means including said tubes and circuits for increasing the plate filament current in said last mentioned tube and decreasing the same in the following tube, said decrease being of a substantially larger order of magnitude than said increase.

5. In a system for bringing about the operation of an indicator by the rapid change in the plate filament current of a vacuum tube comprising a plurality of vacuum tubes and circuits having partly in common in the plate filament circuits resistance means and separate connecting points on said resistance means for the filament and grid of one of said tubes, and means including said tubes and circuits for increasing the plate filament current in one tube and decreasing the same in another tube, the change in one being of a different order of magnitude from the other.

6. In a system for bringing about the operation of an indicator by the rapid change in the plate filament current of a vacuum tube comprising a plurality of vacuum tubes and circuits, means included in the plate filament circuits of said tubes having different connecting points for the filament and grid of one of said tubes, and means including said tubes and circuits for increasing the plate filament circuit in one tube and decreasing the same in another tube, the change in one being of a different order of magnitude from the other.

7. In a system for bringing about the operation of an indicator by the rapid change in the plate filament current of a vacuum tube comprising a plurality of vacuum tubes and circuits connected in cascade, means included in the plate filament circuits of said tubes having different potential connecting points for the filament and grid of one of said tubes, means for impressing a potential in a chosen direction upon the grid of one of said tubes and means for impressing a potential in the opposite direction on the grid of the following tube, said action changing rapidly the plate filament current in said first mentioned tube and bringing about further potential changes with respect to said potential connecting points whereby the action becomes cumulative.

8. In a system for bringing about the operation of an indicator by a rapid change in the plate filament current of a vacuum tube comprising means for impressing a potential change in a chosen direction upon the grid of one vacuum tube and means for impressing a potential change in the opposite direction upon the grid of a following tube, thereby changing the plate filament current in the latter tube, and means operated by the change in said plate filament current for impressing a further potential change in the said chosen direction upon the grid of the first vacuum tube, whereby a complete change of the plate filament current in the last tube produces a cumulative effect.

9. In a system for bringing about the operation of an indicator by a rapid change in the plate filament current of a vacuum tube comprising means for impressing a potential change in a chosen direction upon the grid of one vacuum tube and means for impressing a potential change in the opposite direction upon the grid of a following tube, thereby changing the plate filament current in the latter tube, means operated by the change in said plate filament current for impressing a further potential change in the said chosen direction upon the grid of the first vacuum tube, whereby a complete change of the plate filament current in the last tube produces a cumulative effect, and means operated by the rapid change in said current for causing an indication.

10. In a system for bringing about the operation of an indicator by a rapid change in the plate filament current of a vacuum tube comprising means for impressing a potential change in a chosen direction upon the grid of one vacuum tube and means for impressing a potential change in the opposite direction upon the grid of a following tube, thereby changing the plate filament current in the latter tube, means operated by the change in said plate filament current for impressing a further potential change in the said chosen direction upon the grid of the first vacuum tube, whereby a complete change of the plate filament current in the last tube produces a cumulative effect, and an indicator operated by the voltage induced from the rapid current change.

11. In a system for indicating the reception of wave energy, a detector circuit, an electron tube relay circuit adapted to cause a rapid change in current in an indicating circuit upon the reception of wave energy, and means included in the detector circuit for adjusting the maximum amplitude of the impressed impulse, whereby the electron tube relay circuit is spared of any undesired effect.

12. In a system for indicating the reception of wave energy, an electron tube relay circuit including means for building up an abnormal condition in response to an impressed potential, a detector circuit for impressing a potential in a definite direction upon the electron tube circuit, and means included in the latter circuit for effecting a restoration of the normal conditions in the circuit after the reception of the wave energy.

13. In a system for operating an indicator by means of the transient change in current in the plate filament circuit of a vacuum tube, means operated through an initial electric impulse for inducing a potential upon the grid of said vacuum tube in the direction opposite to the normally impressed potential with respect to the filament of the same tube and thereby commencing the change in said plate filament current, means operated by said change for rapidly increasing said change and means for more slowly reestablishing normal conditions after said change is over, whereby the restoration of conditions will not cause the operation of the indicator.

14. A system for indicating the reception of a sound signal substantially simultaneously with its reception comprising a sound receiver for receiving the sound and converting the same to corresponding electric variations, a filter operatively connected to said receiver for eliminating other than the signal desired to be received, indicating means and means operatively connecting said filter to said indicating means including a vacuum tube and circuit having normally a uniform plate filament current and means for rapidly decreasing said plate current including means for rapidly increasing the negative potential on the grid of said tube comprising a vacuum tube and circuit connected to the input of said first mentioned tube and a resistance connected in common in both filament plate circuits of both tubes for impressing the negative drop as a transient phenomenon on the first mentioned tube.

15. A system for indicating the reception of a sound signal substantially simultaneously with its reception comprising a sound receiver for receiving the sound and converting the same to corresponding electric variations, a filter operatively connected to said receiver for eliminating other than the signal desired to be received, electric discharge indicator and means operatively connecting said filter to said electric discharge indicator including a vacuum tube and circuit having normally a uniform plate filament current and means for rapidly decreasing said plate current including means for rapidly increasing the negative potential on the grid of said tube comprising a vacuum tube and circuit connected to the input of said first mentioned tube and a resistance connected in common in both filament plate circuits of both tubes for impressing the negative drop as a transient phenomenon on the first mentioned tube.

16. In a system for indicating the reception of wave energy, an electron tube relay circuit including means for causing a collapse of the plate current in said circuit in response to an impressed signal, a detector circuit for impressing a signal potential in a definite direction upon the electron tube circuit, and means included in the latter circuit for effecting a restoration of the normal plate current in the circuit after the reception of the wave energy.

In testimony whereof I affix my signature.

EDWIN E. TURNER, Jr.